(12) United States Patent
Li et al.

(10) Patent No.: US 8,441,913 B2
(45) Date of Patent: May 14, 2013

(54) SWITCHING DIVERSITY IN BROADCAST OFDM SYSTEMS BASED ON MULTIPLE RECEIVE ANTENNAS

(75) Inventors: Linbo Li, San Diego, CA (US); Ashok Mantravadi, San Diego, CA (US); Fuyun Ling, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 809 days.

(21) Appl. No.: 11/521,701

(22) Filed: Sep. 15, 2006

(65) Prior Publication Data
US 2007/0115801 A1 May 24, 2007

Related U.S. Application Data

(60) Provisional application No. 60/721,373, filed on Sep. 27, 2005.

(51) Int. Cl.
*H04J 11/00* (2006.01)
(52) U.S. Cl.
USPC .......... 370/208; 370/334; 455/13.3; 455/136; 455/562.1; 455/575.7
(58) Field of Classification Search ................ 455/67.11, 455/234.1, 232, 561, 562.1, 272; 370/343, 370/480, 389, 208, 332, 338, 352, 335; 707/104.1, 707/E17.009, E17.032; 333/132; 375/347, 375/260
See application file for complete search history.

(56) References Cited

U.S. PATENT DOCUMENTS

| | | | | |
|---|---|---|---|---|
| 6,483,884 B1 * | 11/2002 | Shen et al. | ..................... | 375/347 |
| 6,892,059 B1 * | 5/2005 | Kim et al. | ..................... | 455/272 |
| 6,980,833 B1 * | 12/2005 | Hiramatsu | ................. | 455/562.1 |
| 6,985,544 B2 * | 1/2006 | Matsui et al. | ................. | 375/347 |
| 7,257,112 B2 * | 8/2007 | Liang | ............................ | 370/352 |
| 7,672,382 B2 * | 3/2010 | Yoshida et al. | ............... | 375/260 |
| 7,970,367 B1 * | 6/2011 | Groe | ............................ | 455/133 |
| 2002/0164963 A1 | 11/2002 | Tehrani | | |
| 2003/0002471 A1 * | 1/2003 | Crawford et al. | ............. | 370/343 |
| 2003/0026366 A1 | 2/2003 | Matsui et al. | | |

(Continued)

FOREIGN PATENT DOCUMENTS

| | | |
|---|---|---|
| EP | 001049271 A1 * | 2/2000 |
| EP | 1 557 963 A2 | 7/2005 |

(Continued)

OTHER PUBLICATIONS

International Search Report and Written Opinion—PCT/US2006/037941, International Search Authority—European Patent Office—Feb. 26, 2007.

(Continued)

*Primary Examiner* — Michael Thier
*Assistant Examiner* — Vincelas Louis
(74) *Attorney, Agent, or Firm* — Fulbright & Jaworski L.L.P.

(57) ABSTRACT

Systems and methods are provided for enhancing signal quality at receivers in a wireless network. In one embodiment, an antenna is selected from a subset of antennas based on a signal quality parameter such as received signal power or signal-to-noise ratio (SNR). In another embodiment, multiple antennas are applied to independent signal processing paths for the respective antennas where output from the paths is then combined to enhance overall signal quality at the receiver.

40 Claims, 10 Drawing Sheets

U.S. PATENT DOCUMENTS

| | | | |
|---|---|---|---|
| 2003/0053412 A1* | 3/2003 | Yoshida et al. | 370/208 |
| 2004/0008648 A1* | 1/2004 | Schmidl et al. | 370/335 |
| 2004/0229650 A1* | 11/2004 | Fitton et al. | 455/561 |
| 2005/0096001 A1 | 5/2005 | Kandala | |
| 2005/0113039 A1* | 5/2005 | Tsukamoto | 455/101 |
| 2005/0152358 A1* | 7/2005 | Giesberts et al. | 370/389 |
| 2005/0208897 A1* | 9/2005 | Lyons et al. | 455/67.11 |
| 2005/0272384 A1* | 12/2005 | Kogure | 455/134 |
| 2007/0075803 A1* | 4/2007 | Kemmochi et al. | 333/132 |
| 2008/0126420 A1* | 5/2008 | Wright et al. | 707/104.1 |
| 2008/0126422 A1 | 5/2008 | Lai | |

FOREIGN PATENT DOCUMENTS

| | | | |
|---|---|---|---|
| EP | 1557963 | * | 7/2005 |
| EP | 1671432 | A2 | 6/2006 |
| JP | 2000278243 | A | 10/2000 |
| KR | 1020010012421 | | 2/2001 |
| KR | 1020020022114 | | 3/2002 |
| KR | 20056934 | | 1/2005 |
| TW | 576026 | | 11/2004 |
| TW | I231666 | | 4/2005 |
| WO | WO9852300 | | 11/1998 |
| WO | WO0203570 | | 1/2002 |

OTHER PUBLICATIONS

Taiwanese Search report—095135899—TIPO—Sep. 28, 2010.

* cited by examiner

SWITCHING DIVERSITY IN BROADCAST OFDM SYSTEMS BASED ON MULTIPLE RECEIVE ANTENNAS

CLAIM OF PRIORITY UNDER 35 U.S.C. §119

The present application for patent claims priority to Provisional Application No. 60/721,373 entitled "SWITCHING DIVERSITY IN BROADCAST OFDM SYSTEMS BASED ON MULTIPLE RECEIVE ANTENNAS" filed Sep. 27, 2005, and assigned to the assignee hereof and hereby expressly incorporated by reference herein.

BACKGROUND

I. Field

The subject technology relates generally to communications systems and methods, and more particularly to systems and methods that enhance receiver performance in a wireless system by exploiting multiple antennas at the receiver.

II. Background

One technology that has dominated wireless systems is Code Division Multiple Access (CDMA) digital wireless technology. In addition to CDMA, an air interface specification defines FLO (Forward Link Only) technology that has been developed by an industry-led group of wireless providers. In general, FLO has leveraged the most advantageous features of wireless technologies available and used the latest advances in coding and system design to consistently achieve the highest-quality performance. One goal is for FLO to be a globally adopted standard.

The FLO technology was designed in one case for a mobile multimedia environment and exhibits performance characteristics suited ideally for use on cellular handsets. It uses the latest advances in coding and interleaving to achieve the highest-quality reception at all times, both for real-time content streaming and other data services. FLO technology can provide robust mobile performance and high capacity without compromising power consumption. The technology also reduces the network cost of delivering multimedia content by dramatically decreasing the number of transmitters needed to be deployed. In addition, FLO technology-based multimedia multicasting complements wireless operators' cellular network data and voice services, delivering content to the same cellular handsets used on 3G networks.

The FLO wireless system has been designed to broadcast real time audio and video signals, apart from non-real time services to mobile users. The respective FLO transmission is carried out using tall and high power transmitters to ensure wide coverage in a given geographical area. In a broadcast Orthogonal Frequency Division Multiplexing (OFDM) system such as FLO, respective OFDM symbols are organized into frames having physical layer packets that are encoded with a Reed-Solomon (R-S) code and distributed across the frames to exploit time-diversity of a fading channel. Time diversity implies that several channel realizations are observed over the duration of each code block and hence, the packets can be recovered even if there was a deep fade during some of the packets. However, for very low speeds of a mobile handset or receiver (small Doppler spread), the channel coherence time is long compared to the time-span of a Reed-Solomon code block and thus, the channel evolves slowly. As a result, little time-diversity can be gained within a Reed-Solomon code block (for FLO, a Reed-Solomon code block spans across four frames. As a result, the duration of a Reed-Solomon code block is approximately 0.75 second). The prior approach was to use a single receive antenna on the handset. However, as the speed of the mobile handset (or Doppler spread) changes, especially for low Doppler spread scenarios, the performance of single receive antenna FLO receiver architectures can degrade.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided to facilitate receiver performance in a broadcast wireless network by employing multiple antennas at the receiver that cooperate to enhance signal quality in the receiver. In one embodiment, at least two antennas are employed at the receiver, where the antennas are monitored and switching components are utilized to select an antenna from a subset of antennas. The selected antenna from the subset generally provides the strongest signal power, highest signal-to-noise ratio (SNR), or other signal quality parameter at the receiver thus enhancing the quality of signal to be processed at the receiver. In another embodiment, a dual-track (or multi-track) approach is applied where multiple antennas are adapted to separate receiver processing paths. Respective output from the paths is then combined in what is referred to as a maximum ratio combining technique to enhance overall signal quality at the receiver.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for enhancing signal quality at receivers in a wireless network. In one embodiment, an antenna is selected from a subset of antennas based on a signal quality parameter such as received signal power or signal-to-noise ratio (SNR). In another embodiment, multiple antennas are applied to independent signal processing paths for the respective antennas where output from the paths is then combined to enhance overall signal quality at the receiver. By employing multiple receive antennas, and selecting from a subset of antennas or providing independent processing paths for the antennas, signal quality and hence performance of the receiver can be improved in the wireless network.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
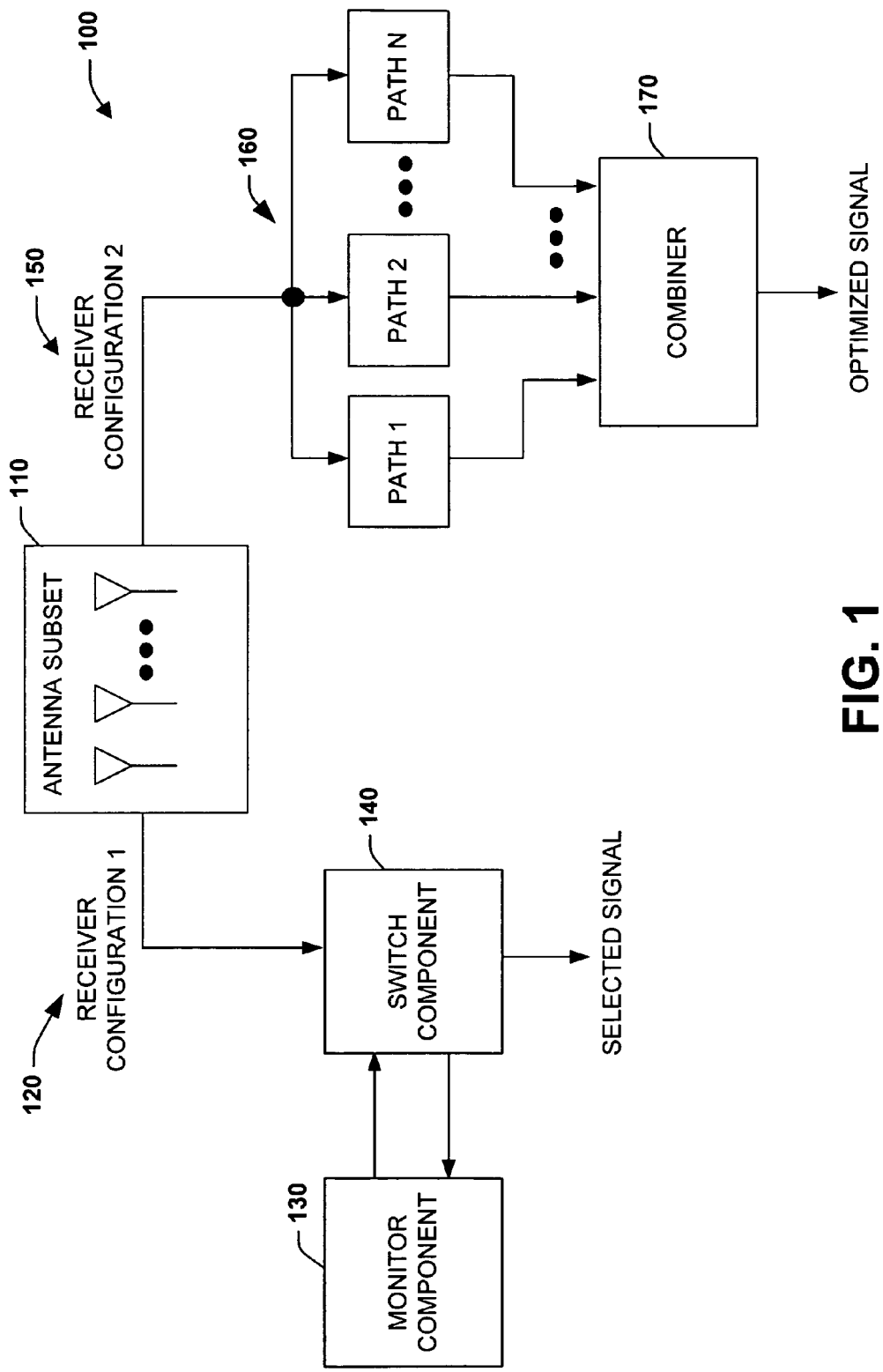
FIG. 1 is a schematic block diagram illustrating a wireless network receiver system.

FIG. 1 illustrates a wireless network receiver system 100 that employs an antenna subset 110 at the receiver, where the antenna subset 110 includes two or more antennas. As illustrated, a first receiver configuration is illustrated at 120 where a monitor component 130 measures signals from the antenna subset 110 and a switch component 140 selects an antenna to receive and further process a wireless signal based on the measurement from the monitor component. In another receiver configuration at 150, a separate signal path 160 can be adapted to each antenna in the subset 110, where a combiner 170 produces an optimized signal from the combination of signals provided by the subset.

With respect to the first receiver configuration 120, by employing two or more diversity antennas and switching to the antenna with stronger Received Signal Strength Indication (RSSI) or higher Signal-to-Noise Ratio (SNR), the configuration 120 exploits antenna diversity and improves receiver performance. In one example, this is beneficial for slow fading channels to compensate for the lack of time-diversity. Due to the bursting nature of Forward Link Only (FLO) transmissions, the RSSI measurement, SNR calculation (or other parameter measurement) and antenna selection is performed before the start of Multicast Logical Channel (MLC) processing. Thus, decoding of respective OFDM symbols of interest are generally not affected. The added power consumption for RSSI measurement or SNR calculation and antenna selection is also fairly insignificant. In the presence of antenna differential, switching diversity can be turned off at high Doppler spread so that performance in this scenario should not be impacted. The RSSI can be calculated based on Low Noise Amplifier (LNA) state information and the Automatic Gain control (AGC) loop accumulator values in a straightforward manner.

It is noted that in one approach, an algorithm can be employed to estimate noise variance at the receiver. The baseband composite received power which includes power from both signal and noise is also computed. The ratio of the composite received power to the estimated noise variance is taken and serves as an indication of the received SNR. The antenna with higher received SNR is selected and used for data reception of the current frame. Another switching technique can be to select the antenna independently at each sub-carrier (or combine the two observations). However, this can increase receiver complexity, since it may employ a second set of RF chains, having two FFT blocks at the base-band and the per sub-carrier antenna selection logic.

It is noted that in another approach, an antenna switching scheme can be based on effective SNR. The effective SNR is an indication of received signal quality when the channel realization varies across a code word (due to time-variation or frequency variation or both). The effective SNR can be a monotonous function of the average constrained capacity. For an OFDM symbol, the average constrained capacity for a set of subcarriers with a common modulation scheme m is calculated as the following:

$$C_i = \frac{1}{N_c} \sum_{k=0}^{N_c-1} \phi_m\left(\frac{|H_{i,k}|^2}{\sigma^2}\right) \quad (1)$$

where $H_{i,k}$ is a channel estimate for subcarrier k of OFDM symbol i, and $\sigma^2$ is the variance of the additive noise/interference. The constrained capacity function $\phi_m(.)$ generally depends on the modulation scheme m, e.g., QPSK, 16QAM, and so forth. The average constrained capacity is a monotonous function of the effective SNR, with higher effective SNR representing higher average constrained capacity. Therefore, antenna selection can be determined by the average constrained capacity. In this scheme, the average constrained capacity can be calculated for the preamble symbols reserved for antenna selection for both antennas based on the channel estimate and noise variance estimate according Equation (1). The antenna with higher average constrained capacity (hence higher effective SNR) can be selected and used for data reception. For the case in which the subcarriers for the OFDM symbol of interest are modulated by different modulation schemes, one possibility of the antenna selection is based on the average constrained capacity of the subcarriers with the lowest modulation size. In this case, the summation in Equation (1) should be over the subcarriers with the lowest modulation size.

Figure 4:
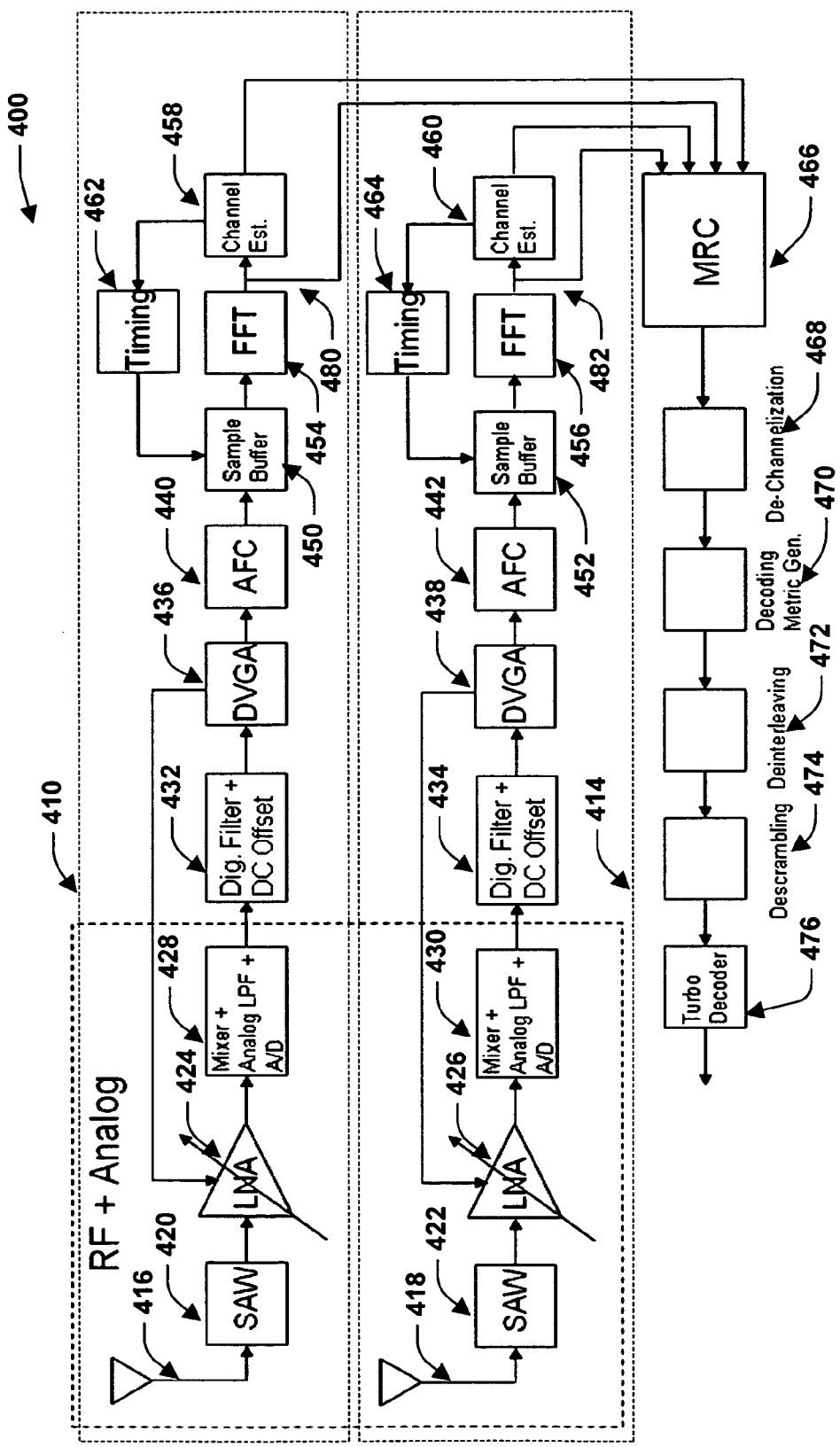
FIG. 4 illustrates an example multi-path processing component for a wireless receiver system.

In addition to switching diversity provided at 120 between antennas in the subset 110, a maximum ratio combining (MRC) technique for a FLO-like broadcast OFDM system is provided at the configuration 160. Being different from the switching diversity scheme which selects the antenna with stronger RSSI or higher SNR for reception and demodulation based on the overall received power at each antenna at 120, maximum ratio combining combines received signals from the designated antennas in the subset 110 independently at each sub-carrier post Fast Fourier Transform (FFT) processing. An example diagram of an MRC in a FLO-like OFDM system is illustrated in FIG. 4, whereas an example switching diversity system is illustrated in FIG. 2.

As noted above, one approach for signal processing is to have at least two separate antennas on a receiver handset. For simplicity, the following discussion is related to having two receive antennas, however it is to be appreciated that the systems and methods described herein can be readily generalized to more than two receive antennas in the subset 110. In addition, though the system 100 is motivated in part by the desire to improve performance at low Doppler spreads, it is not generally coupled to Reed-Solomon (R-S) coding and facilitates signal performance even when such coding is absent. For FLO-like OFDM broadcast systems, typically a fraction of the frame duration is used to transmit packets of interest to the receiver. These packets could correspond to particular content being broadcast, and multiple content channels can be multiplexed into the respective frame. These set of packets of interest can be referred to as an MLC (Multicast Logical Channel). To reduce power consumption, the receiver is typically operating during the OFDM symbols of interest and a small number of preamble and post-amble symbols for the frame.

Figure 2:
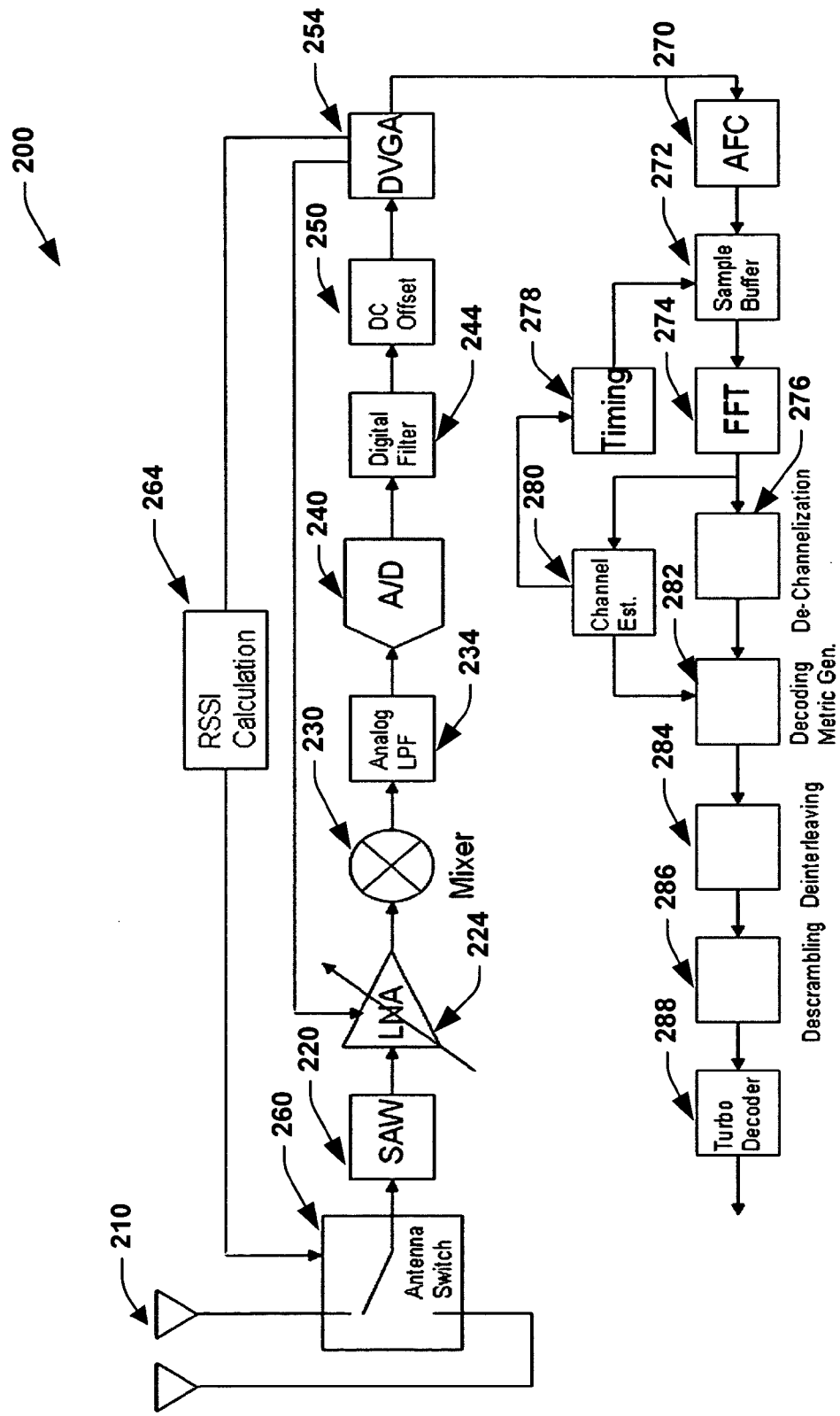
FIG. 2 is an example receiver switching component that employs multiple antennas to enhance signal quality.

FIG. 2 illustrates an example receiver switching system 200 that employs multiple antennas to enhance signal quality. Before proceeding, and as noted above, the more than two antennas can be employed than shown in the example switching system 200. Received signal strength can be measured on antennas 210 during preamble symbols of a current frame. The antenna with the stronger received power is then selected and used for data reception of the entire frame. Specifically in this example, one RF chain is implemented in the receiver. The RF chain includes a front-end RF filter, low noise amplifier (LNA) 224, mixer 230, analog base-band low-pass filter 234, an A/D converter 240, a digital filter 244, a DC correction component 250, and an automatic gain control (AGC) 254. A switch 260 connects one of the antennas 210 to the RF chain (e.g., analog switch).

Typically, before the start of an MLC of a current frame, the AGC 254 powers up and a first antenna 210 is connected to the RF chain. At the end of the AGC acquisition period, based on the information of the current LNA gain state and the AGC loop accumulator, a received signal strength indication (RSSI) of the first antenna is calculated at 264. Then, a second antenna is selected by the switch 260 and connected to the RF chain. After the AGC acquisition period for the second antenna elapses, its RSSI is calculated at 264 and compared with that of the first antenna 210. The antenna with higher RSSI is selected and used for data reception of the current frame. Therefore, at least two AGC acquisition periods of OFDM symbols can be employed to perform a decision on antenna selection prior to the subsequent preamble and MLC symbols. To reduce receiver power consumption, during AGC acquisition and RSSI measurement, successive blocks of AGC can be turned off. An alternative embodiment is to have two sets of RF chains and A/D, DC, and DGVA blocks implemented so that AGC acquisition and RSSI calculation for both antennas can proceed concurrently as described below with respect to FIG. 4. This can save the time of one RSSI measurement period at the trade-off of increased receiver complexity.

For the system 200, antenna switching is generally not allowed during the data demodulation of a frame. That is, antenna selection is made once per frame. An alternative method is to have other or higher antenna switching rates such as once per MLC assuming a suitable gap between MLCs for antenna selection. This can also include switching during an MLC provided that time-averaging of the channel estimates is disabled. For very slow antenna selection rates, lesser diversity is realized in fading channels since the selected antenna may not remain the best antenna as the channel changes. Very high antenna switching rates could help in continuing to provide antenna diversity at higher Doppler spreads. However, switching an antenna during MLC demodulation could disrupt the base-band receiver operations such as AGC and channel estimation averaging. Switching at high rate can also increase the receiver power consumption. As can be appreciated, the system 200 can be employed as part of a wireless communications device. This can include means for monitoring a subset of antennas at a wireless device (e.g., RSSI component 264), means for selecting one antenna from the subset of antennas (e.g., Antenna analog switch 260); and means for processing a signal from the selected antenna (e.g., RF filter, low noise amplifier (LNA) 224, mixer 230, analog base-band low-pass filter 234, an A/D converter 240, a digital filter 244, a DC correction component 250, and an automatic gain control (AGC) 254).

Figure 3:
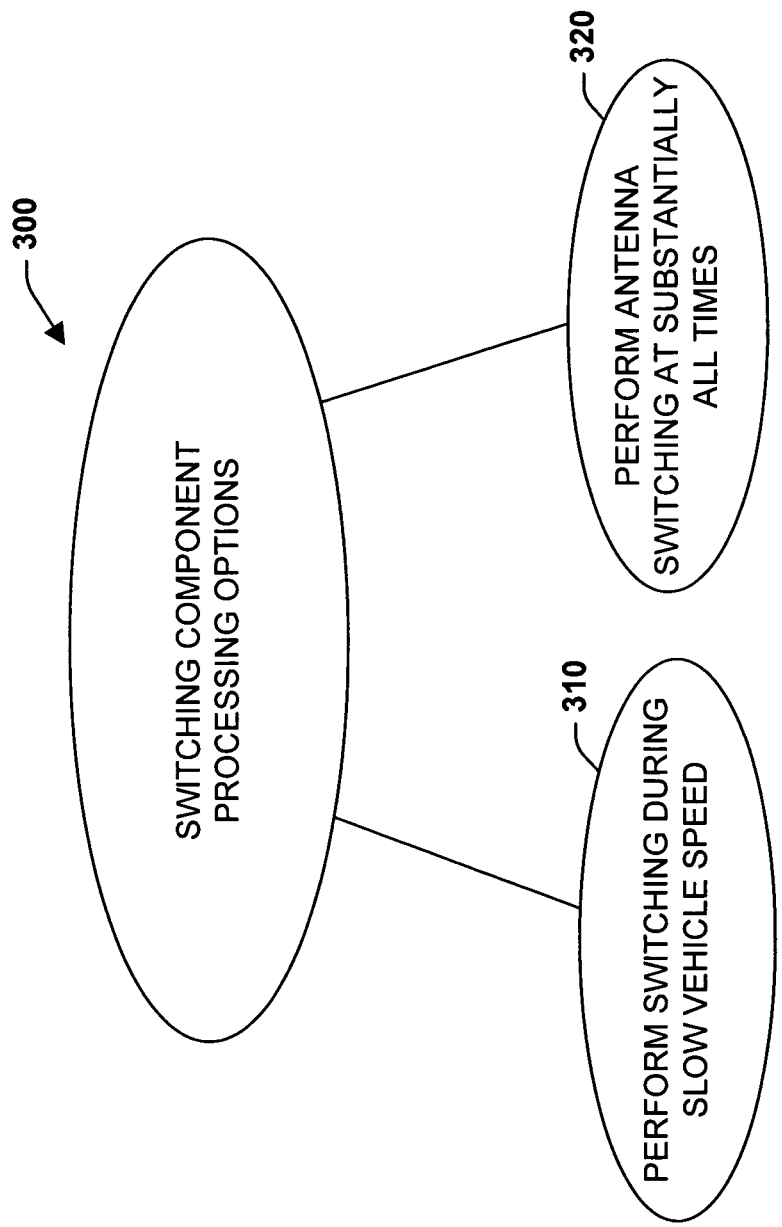
FIG. 3 is illustrates example switching component processing options for a wireless receiver.

Other components in the switching system 200 can include an automatic frequency control (AFC) 270 that receives input from the DGVA 254. Output from the AFC 270 then feeds a sample buffer 272, a Fast Fourier Transform (FFT) component 274, and a de-channelization component 276. A timing component 278 and a channel estimation component 280 can be employed as feedback elements. Other components in the switching system 200 can include a decoding metric generator 282, a de-interleaving component 284, a descrambling component 286, and a turbo decoder 288;

FIG. 3 illustrates example switching component processing 300 for a wireless receiver. In the antenna diversity system discussed above in FIG. 2, at least two options are available for the operation of the antenna switching block at 260 of FIG. 2. One option at 310 is to perform antenna switching when the mobile receiver is moving at low vehicular speed (or the Doppler spread is small). The other option at 320 is to substantially always have switching turned on. Option 310 is discussed in more detail as follows.

The first switching processing option 310 may be of generally more interest when there is differential between two or more antennas. For FLO systems, the primary antenna may have a gain that is approximately 5 dB higher than the secondary antenna. The gain on the second antenna could be lesser because it is tuned to operate in different frequency band (e.g., CDMA) or due to form factor considerations, for example. By having the switching block always on, for high Doppler spread there is a possibility that the secondary antenna is chosen during RSSI measurement while it turns out that the primary antenna has stronger received power during most of the MLC of interest. As a result, turning on the switching block only for low vehicular speed (small Doppler spread) can be beneficial. A method can be adopted to estimate the Doppler spread based on channel estimates of adjacent OFDM symbols. Thus, the switching diversity block is turned on only when the channel time correlation is higher than a pre-determined threshold. It is noted that a second antenna if employed can be mounted internally due to form factor considerations.

FIG. 4 illustrates an example multi-path processing system 400 for a wireless receiver system. In this example, two sets of analog RF chains are illustrated at 410 and 414. The respective chains 410 and 414 can include SAW filters 420 and 422 which feed low noise amplifiers (LNA) 424 and 426. Output from LNA 424 and 426 can feed mixer, analog LPF, and A/D blocks 428 and 430 which in turn feed digital filter/DC offset blocks 432 and 434. Output from blocks 432 and 434 drive digital variable gain amplifiers (DGVA) 436 and 438 which also drive AFC components 440 and 442, respectively. From the AFC components 440 and 442, are sample buffers 450 and 442, FFT blocks 454 and 456, and channel estimation blocks 458 and 460. Feedback can be provided via timing blocks 462 and 464. Other components in the system 400 include a Maximal Ratio Combining (MRC) block 466, a de-channelization component 468, a decoding metric generator 470, a de-interleaving component 472, a descrambling component 474, and a turbo decoder 476.

The receiver chains 410 and 414 operate concurrently during demodulation of MLC symbols of interest as well as demodulation of preamble and post-amble symbols. Signal received on the antennas 416 and 418 are processed by the receiver chains 410 and 414 separately up to the output of an FFT and channel estimation blocks at 480 and 482 respectively. The FFT output and channel estimate of the receiver chains are then combined at 466 (Maximal Ratio Combining (MRC) block) on a per sub-carrier basis to maximize signal-to-noise ratio and sent to successive blocks for decoding at 468-476. Each receiver chain maintains its own LNA gain state, DVGA gain, DC correction, frequency and time tracking, for example.

At the FFT output at 480 and 482 respectively, let the received signal on the i-th sub-carrier be $r_{i,1}$ and $r_{i,2}$ for receiver chain #1 and #2, respectively, and the frequency-domain channel estimate of sub-carrier i be $c_{i,1}$ and $c_{i,2}$ for receiver chain #1 and #2, respectively. The MRC block 466 combines the output of the two receiver chains for the i-th sub-carrier as following:

$$y_i = c_{i,1}{}^* r_{i,1} + c_{i,2}{}^* r_{i,2}, \qquad (2)$$

Where * denotes the complex conjugate. If the channel estimate is accurate, the per sub-carrier combining of the received signal according to Eq. (1) is optimal in the sense that the signal-to-noise ratio is maximized for each sub-carrier. Significant performance gain can be realized even if there is differential between the two receive antennas. It is noted that the example system 400 can be employed as part of a wireless communications device. This can include means for receiving a signal at a wireless device from at least two signal sources (e.g., antenna subset, blocks 410, 414), a means for processing the signal in a first signal chain and a second signal chain (e.g., mixers, filters, amplifiers, buffers, frequency transform components, estimation components and so forth). This can also include means for combining the first and the second signal chains (e.g., MRC 466).

Figure 5:
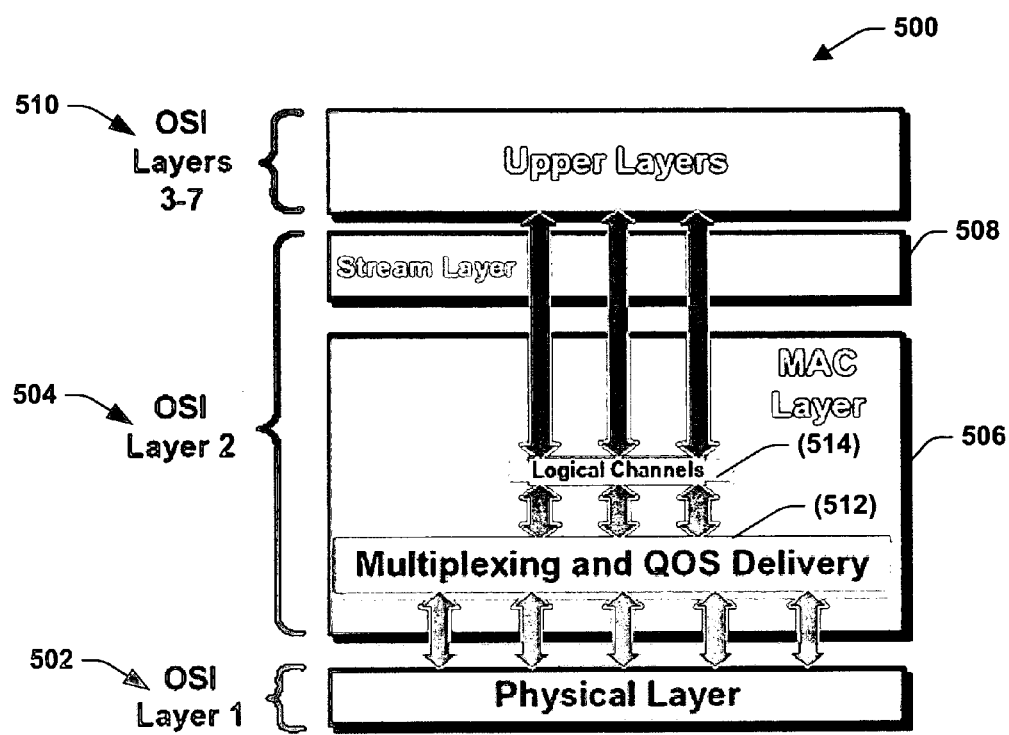
FIG. 5 is a diagram illustrating example network layers for a wireless receiver system.

FIG. 5 illustrates example network layers 500 for a wireless system where data received there from may be employed in the frequency blocks described above. A Forward Link Only (FLO) air interface protocol reference model is shown in FIG. 5. Generally, the FLO air interface specification covers protocols and services corresponding to Open Systems Interconnect (OSI) networking model having Layers 1 (physical layer) 502 and Layer 2 (Data Link layer) 504. The Data Link layer is further subdivided into two sub-layers, namely, Medium Access (MAC) sub-layer 506, and Stream sub-layer 508. Upper Layers 510 include OSI layers 3-7 and can include compression of multimedia content, access control to multimedia, along with content and formatting of control information. The MAC layer 506 includes multiplexing and Quality of Service (QoS) delivery functions 512. The MAC layer 506 also includes logical channels 514.

The FLO air interface specification typically does not specify the upper layers to allow for design flexibility in support of various applications and services. These layers are shown to provide context. The Stream Layer includes multiplexes up to three upper layer flows into one logical channel, binding of upper layer packets to streams for each logical channel, and provides packetization and residual error handling functions. Features of the Medium Access Control (MAC) Layer includes controls access to the physical layer, performs the mapping between logical channels and physical channels, multiplexes logical channels for transmission over the physical channel, de-multiplexes logical channels at the mobile device, and/or enforces Quality of Service (QOS) requirements. Features of Physical Layer include providing channel structure for the forward link, and defining frequency, modulation, and encoding requirements In general, FLO technology utilizes Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). Generally, OFDM technology can achieve high spectral efficiency while effectively meeting mobility requirements in a large cell SFN. Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved.

Figure 6:
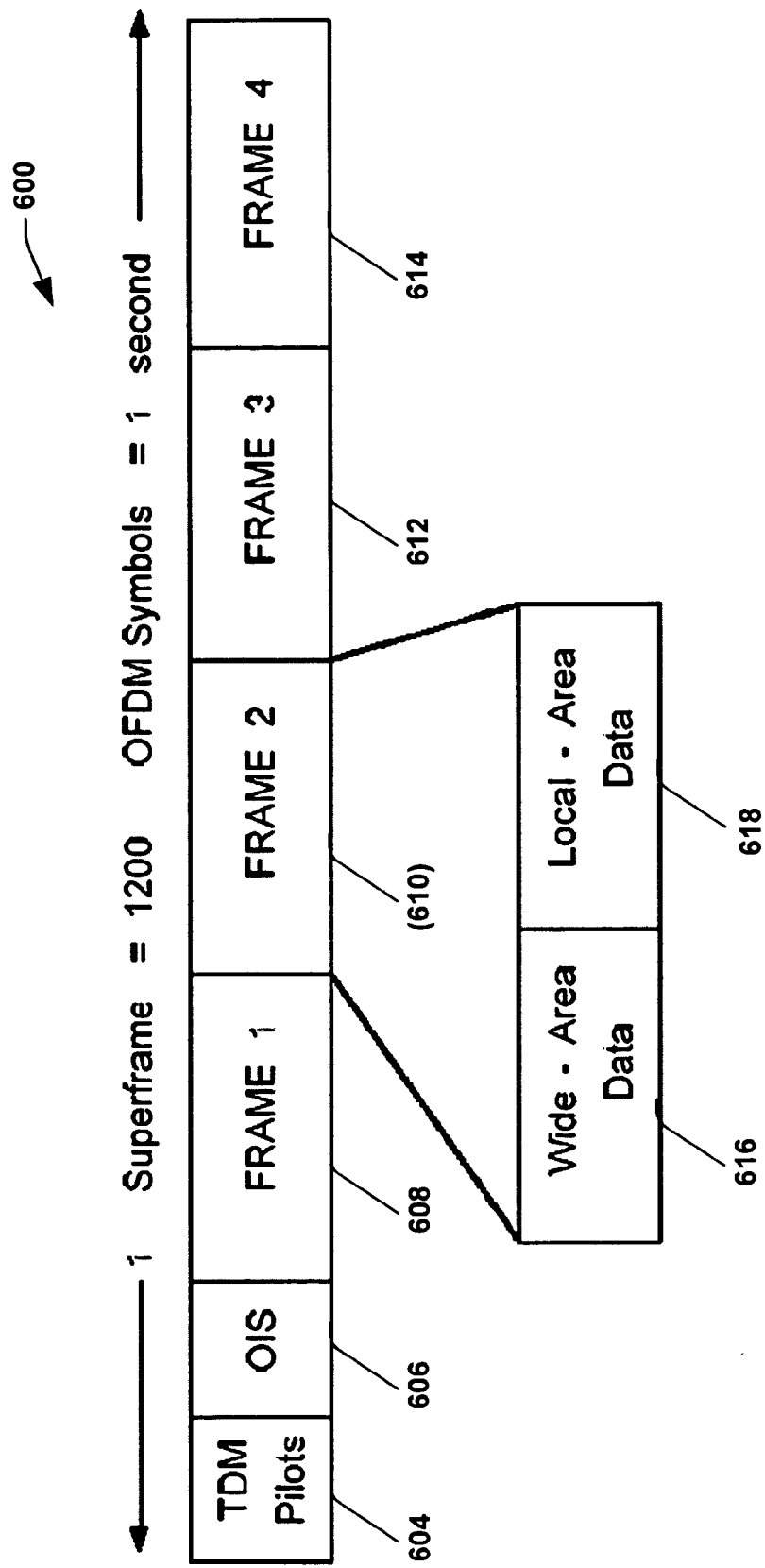
FIG. 6 is a diagram illustrating an example data structure and signal for a wireless receiver system.

Proceeding to FIG. 6, a FLO physical layer 600 is illustrated. In an embodiment, a superframe is equal to 1200 OFDM symbols with a one second time duration. The FLO physical layer uses a 4K mode (yielding a transform size of 4096 sub-carriers), providing superior mobile performance compared to an 8K mode, while retaining a sufficiently long guard interval that is useful in fairly large Single Frequency Networks. Rapid channel acquisition can be achieved through an optimized pilot and interleaver structure design. The interleaving schemes incorporated in the FLO air interface facilitate time diversity. The pilot structure and interleaver designs optimize channel utilization without annoying the user with long acquisition times. Generally, FLO transmitted signals are organized into super frames as illustrated at 600. Each super frame is comprised of four frames of data, including TDM pilots (Time Division Multiplexed) 604, Overhead Information Symbols (OIS) 606 and frames 608, 610, 612, 614, containing wide-area 616 and local-area data 618. The TDM pilots are provided to allow for rapid acquisition of the OIS. The OIS describes the location of the data for each media service in the super frame.

Typically, each super frame consists of 200 OFDM symbols per MHz of allocated bandwidth (1200 symbols for 6 MHz), and each symbol contains 7 interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Error correction and coding techniques can also be employed. Generally, FLO incorporates a turbo inner code 13 and a Reed Solomon (RS) 14 outer code. Typically, the turbo code packet contains a Cyclic Redundancy Check (CRC).

The RS code need not be calculated for data that is correctly received, which, under favorable signal conditions, results in additional power savings. Another aspect is that the FLO air interface is designed to support frequency bandwidths of 5, 6, 7, and 8 MHz. A highly desirable service offering can be achieved with a single Radio Frequency channel.

Figure 7:
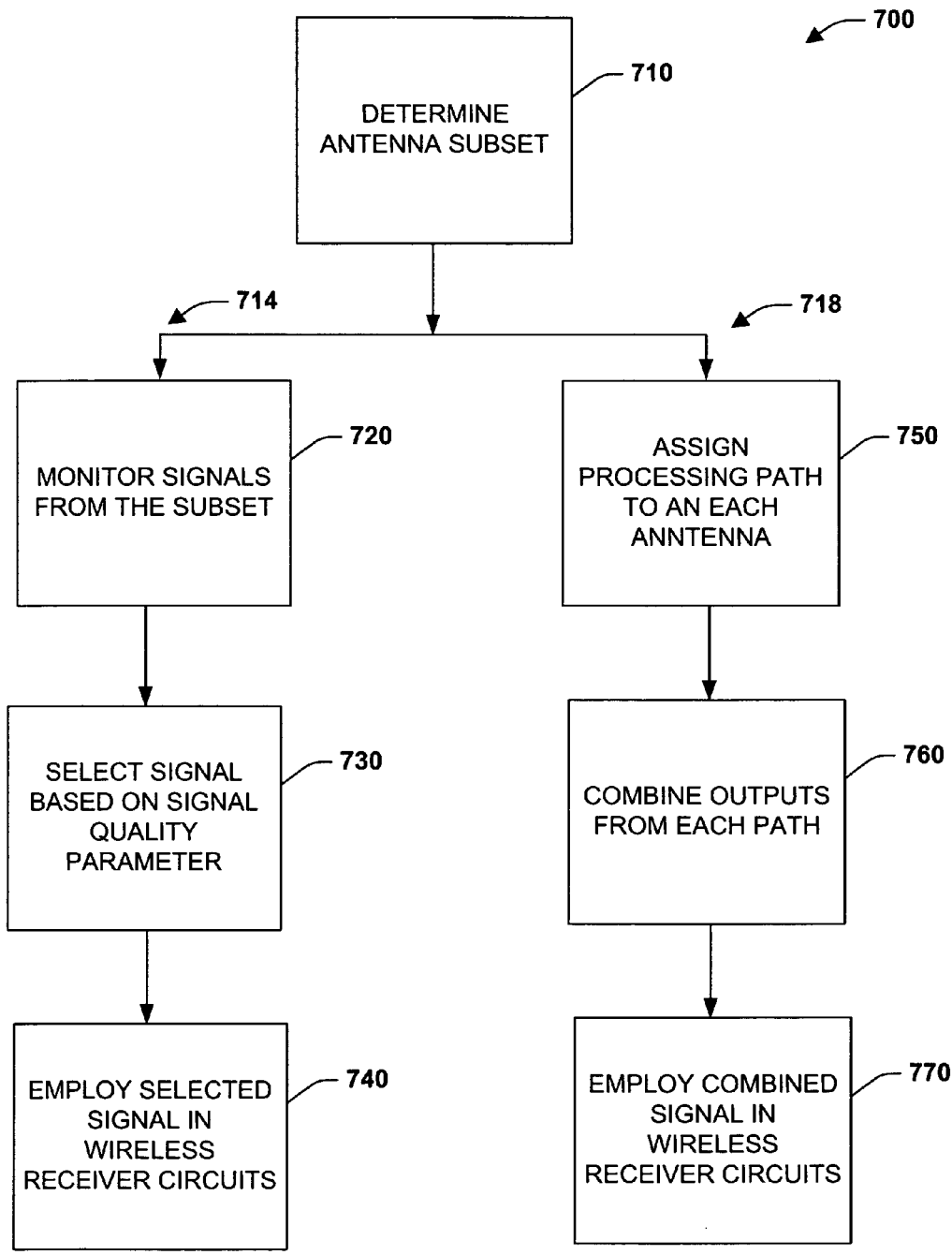
FIG. 7 illustrates an example process for a wireless receiver system.

FIG. 7 illustrates a multi-antenna process 700 for wireless receiver systems. While, for purposes of simplicity of explanation, the methodology is shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Proceeding to 710, an antenna subset is selected. As previously noted, at least two antennas are typically employed for the antenna subset but more than two antennas are possible. Based on a desired receiver configuration, two processing paths are possible for the determined antenna subset at 714 and 718. If the process path 718 is selected, signals from the antenna subset 710 are monitored measured or sampled for various signal parameters such as received signal strength or signal-to-noise ratio. At 730, based on the measurements at 720, an antenna is selected from the subset for receiving a wireless signal. As previously noted, switching decisions can be performed at different times and under differing situations. For instance, in some cases, switching decisions may be performed during specified times such as during detected movement of a receiver. In other cases, monitoring and switching of antennas may be performed at regular intervals such as between super frames or between super frame subsets. At 740, signals from the selected antenna are processed through the respective receiver. This can include amplifying, mixing, digital or analog conversions, filtering, gain controlling, FFT computations, channel estimations, buffering, decoding, descrambling, and so forth.

If the path at 718 is taken in the process 700, a separate signal processing path can be assigned for each antenna employed by the receiver at 750. Such processing paths for the respective antennas can include filters, mixers, amplifiers, gain controllers, buffers, timing components, FFT components, and channel estimation components, for example. At 760, outputs from the individual processing paths are combined. Such combining can include analog processes, digital processes, or a combination thereof and include processes such as maximal ratio combining, for example. At 770, the combined signals from the respective antenna subset and signal processing paths are further processed in a wireless receiver. Such processing can include de-channelization, decoding, de-interleaving, descrambling, and so forth.

Figure 8:
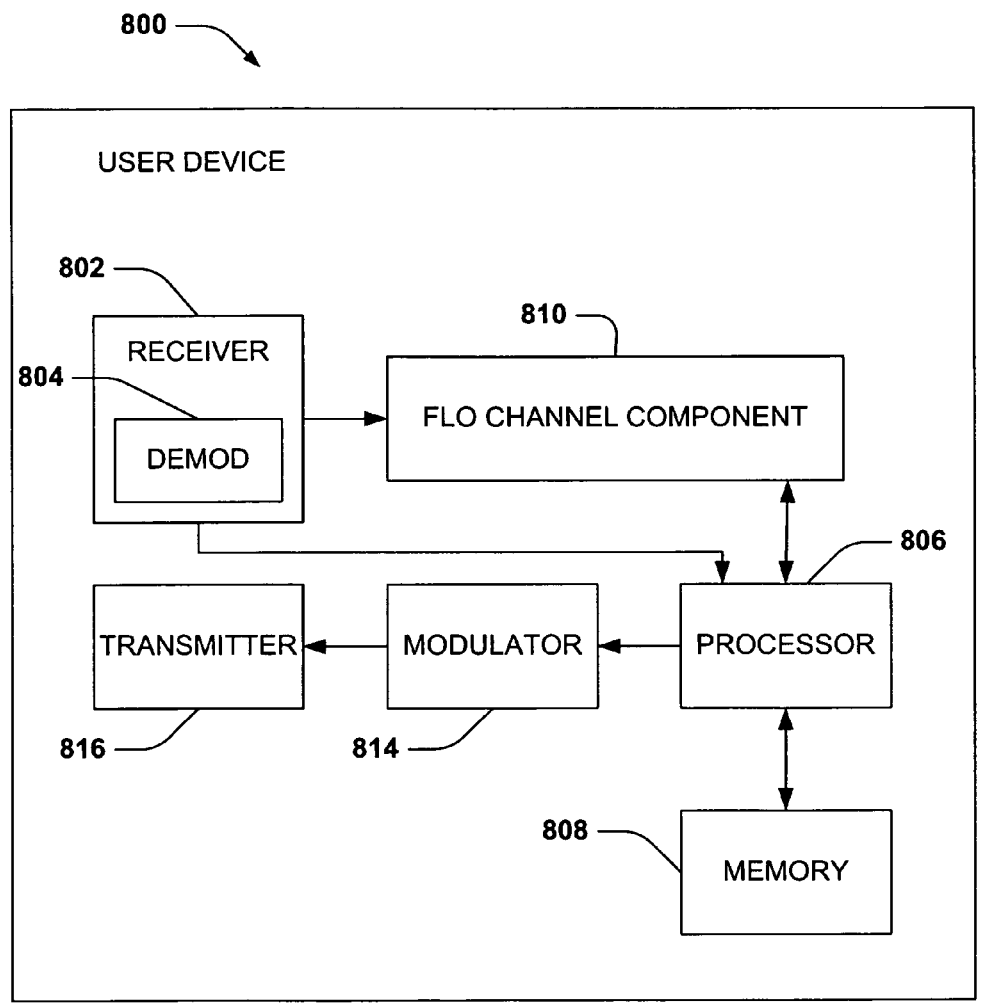
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a non-linear receiver, such as a maximum likelihood (ML)-MMSE receiver or the like. A demodulator 804 can demodulate and provide received pilot symbols to a processor 806 for channel estimation. A FLO channel component 810 is provided to process FLO signals as previously described. This can include digital stream processing and/or positioning location calculations among other processes. Processor 806 can be a processor dedicated to analyzing information received by receiver 802 and/or generating information for transmission by an optional transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to calculated ranks for user device 800, a rank calculation protocol, lookup table(s) comprising information related thereto, and any other suitable information for supporting list-sphere decoding to calculate rank in a non-linear receiver in a wireless communication system as described herein. Memory 808 can additionally store protocols associated rank calculation, matrix generation, etc., such that user device 800 can employ stored protocols and/or algorithms to achieve rank determination in a non-linear receiver as described herein.

It will be appreciated that the data store (e.g., memories) components described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing FLO data, a symbol modulator 814 and a transmitter 816 that transmits the modulated signal.

Figure 9:
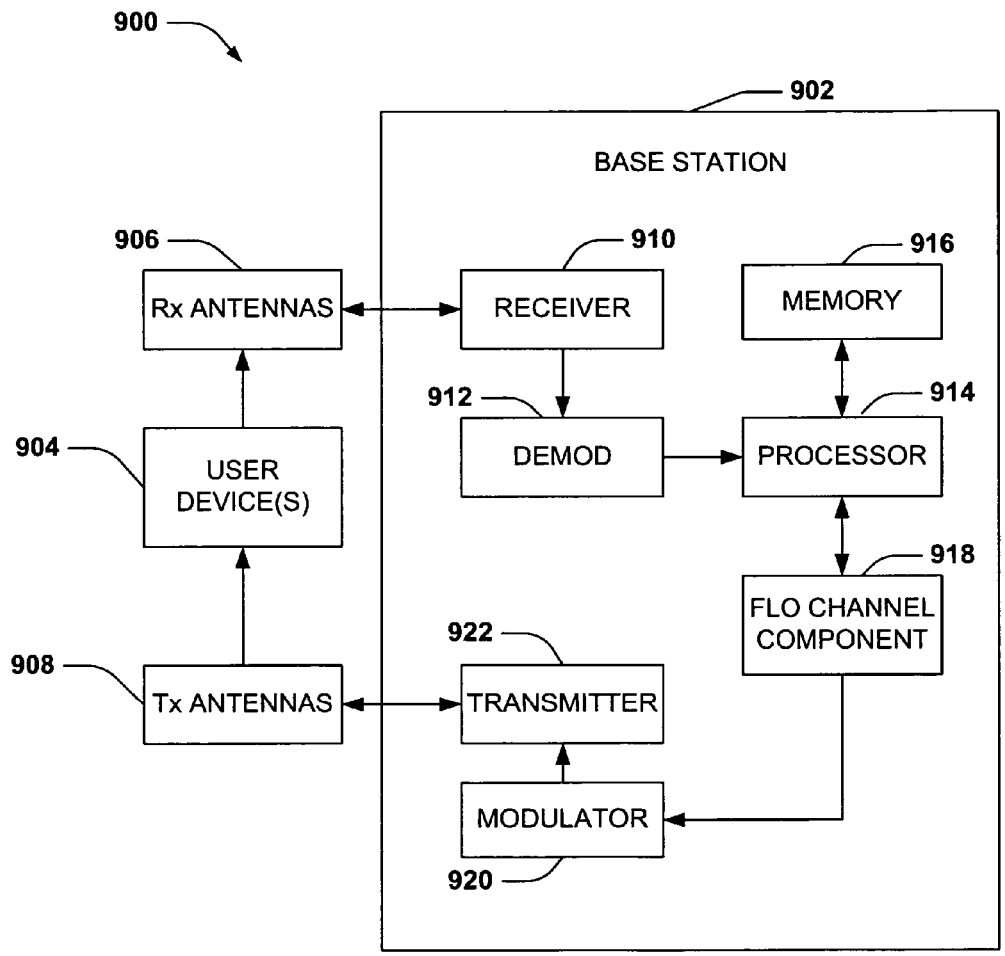
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above with regard to FIG. 8, and which is coupled to a memory 916 that stores information related to user ranks, lookup tables related thereto, and/or any other suitable information related to performing the various actions and functions set forth herein. Processor 914 is further coupled to a FLO channel 918 component that facilitates processing FLO information associated with one or more respective user devices 904.

A modulator 922 can multiplex a signal for transmission by a transmitter 924 through transmit antenna 908 to user devices 904. FLO channel component 918 can append information to a signal related to an updated data stream for a given transmission stream for communication with a user device 904, which can be transmitted to user device 904 to provide an indication that a new optimum channel has been identified and acknowledged. In this manner, base station 902 can interact with a user device 904 that provides FLO information and employs a decoding protocol in conjunction with a non-linear receiver, such as an ML-MIMO receiver, and so forth.

Figure 10:
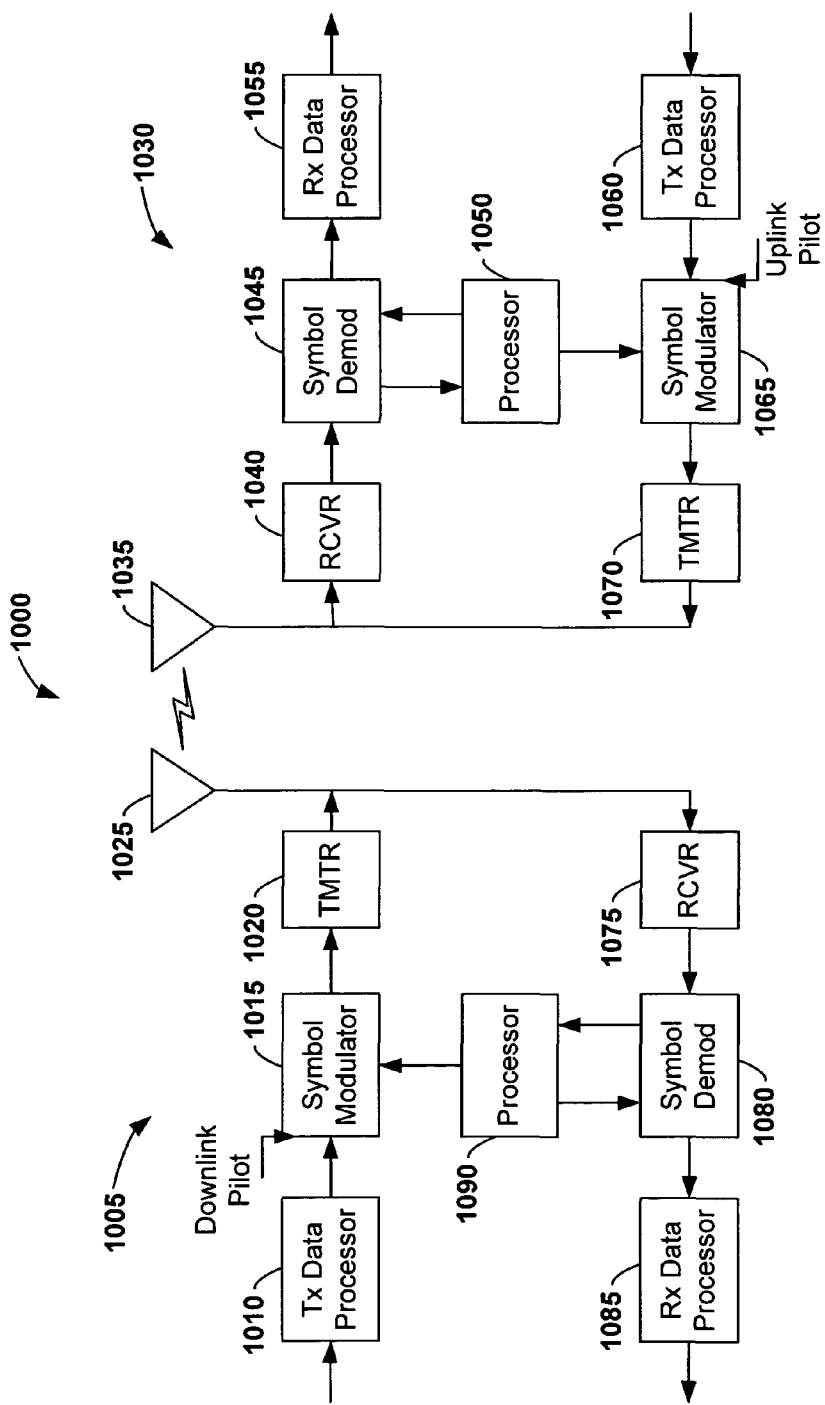
FIG. 10 is a diagram illustrating an example transceiver for a wireless system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005. Other components that may be provided include a TX data processor 1060, a symbol modulator 1065, a transmitter unit 1070, a receiver unit 1075, a symbol demodulator 1080, an RX data processor 1085, and a processor 1090.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A receiver processing method on a communication link of a multicast wireless network, comprising:
   calculating a time correlation value based on one or more channel estimates for a signal received over the communication link; and
   performing, if the time correlation value is above a threshold indicative of a small Doppler spread, the operations of:
   (i) monitoring a signal parameter from a subset of antennas;
   (ii) selecting at least one antenna from the subset of antennas based on the signal parameter, wherein the selected at least one antenna is used exclusively for data reception of a current frame; and
   (iii) processing at least one signal from the selected at least one antenna in a wireless receiver associated with the subset of antennas.

2. The method of claim 1, wherein the signal parameter is at least one of a received signal strength indication (RSSI) parameter, a Signal-to-Noise Ratio (SNR) parameter, or an effective SNR.

3. The method of claim 1, further comprising decoding Orthogonal Frequency Division Multiplexing (OFDM) symbols.

4. The method of claim 1, further comprising calculating, if the time correlation value is above the threshold, a received signal strength indication (RSSI) based on a Low Noise Amplifier (LNA) state value or an Automatic Gain control (AGC) loop accumulator value.

5. The method of claim 1, wherein the monitoring comprises monitoring during preamble symbols of a current frame.

6. The method of claim 5, wherein the processing at least one signal comprises assigning a radio frequency (RF) chain of components to process the signal.

7. The method of claim 6, wherein the RF chain includes a frontend RF filter, a low noise amplifier (LNA), a mixer, an analog base-band low-pass filter, an A/D converter, a digital filter, a DC correction component, or an automatic gain control (AGC).

8. The method of claim 1, wherein the selecting operation comprises selecting an antenna based on a highest determined signal strength selected.

9. The method of claim 8, wherein the selecting operation further comprises calculating the signal parameter in at least two AGC acquisition periods of OFDM symbols prior to receiving a preamble.

10. The method of claim 9, wherein the processing operation further comprises turning off at least one processing block during the at least two AGC acquisition periods to conserver power.

11. A wireless communications device, comprising:
    means for calculating a time correlation value based on one or more channel estimates for a signal received over a communication link; and
    means for performing, if the time correlation value is above a threshold indicative of a small Doppler spread, the operations of:
        (i) monitoring a signal parameter from a subset of antennas;
        (ii) selecting at least one antenna from the subset of antennas based on the signal parameter, wherein the selected at least one antenna is used exclusively for data reception of a current frame; and
        (iii) processing at least one signal from the selected at least one antenna in a wireless receiver associated with the subset of antennas.

12. The wireless communications device of claim 11, wherein the signal parameter is at least one of a received signal strength indication (RSSI) parameter, a Signal-to-Noise Ratio (SNR) parameter, or an effective SNR.

13. The wireless communications device of claim 11, further comprising means for decoding Orthogonal Frequency Division Multiplexing (OFDM) symbols.

14. The wireless communications device of claim 11, further comprising means for calculating, if the time correlation value is above the threshold, a received signal strength indication (RSSI) based on a Low Noise Amplifier (LNA) state value or an Automatic Gain control (AGC) loop accumulator value.

15. The wireless communications device of claim 11, wherein the monitoring comprises monitoring during preamble symbols of a current frame.

16. The wireless communications device of claim 15, wherein the processing at least one signal comprises assigning a radio frequency (RF) chain of components to process the signal.

17. The wireless communications device of claim 16, wherein the RF chain includes a frontend RF filter, a low noise amplifier (LNA), a mixer, an analog base-band low-pass filter, an A/D converter, a digital filter, a DC correction component, or an automatic gain control (AGC).

18. The wireless communications device of claim 11, wherein the selecting operation comprises selecting an antenna based on a highest determined signal strength selected.

19. The wireless communications device of claim 18, wherein the selecting operation further comprises calculating the signal parameter in at least two AGC acquisition periods of OFDM symbols prior to receiving a preamble.

20. The wireless communications device of claim 19, wherein the processing operation further comprises turning off at least one processing block during the at least two AGC acquisition periods to conserver power.

21. A non-transitory computer readable medium having computer executable instructions stored thereon, which when executed by a machine cause the machine to perform operations comprising:
    calculating a time correlation value based on one or more channel estimates for a signal received over a communication link; and
    performing, if the time correlation value is above a threshold indicative of a small Doppler spread, the operations of:
        (i) monitoring a signal parameter from a subset of antennas;
        (ii) selecting at least one antenna from the subset of antennas based on the signal parameter, wherein the selected at least one antenna is used exclusively for data reception of a current frame; and
        (iii) processing at least one signal from the selected at least one antenna in a wireless receiver associated with the subset of antennas.

22. The non-transitory computer readable medium of claim 21, wherein the signal parameter is at least one of a received signal strength indication (RSSI) parameter, a Signal-to-Noise Ratio (SNR) parameter, or an effective SNR.

23. The non-transitory computer readable medium of claim 21, having further computer executable instructions stored thereon, which when executed by the machine cause the machine to perform further operations comprising:
    decoding Orthogonal Frequency Division Multiplexing (OFDM) symbols.

24. The non-transitory computer readable medium of claim 21, having further computer executable instructions stored thereon, which when executed by the machine cause the machine to perform further operations comprising:
    calculating, if the time correlation value is above the threshold, a received signal strength indication (RSSI) based on a Low Noise Amplifier (LNA) state value or an Automatic Gain control (AGC) loop accumulator value.

25. The non-transitory computer readable medium of claim 21, wherein the monitoring comprises monitoring during preamble symbols of a current frame.

26. The non-transitory computer readable medium of claim 25, wherein the processing at least one signal comprises assigning a radio frequency (RF) chain of components to process the signal.

27. The non-transitory computer readable medium of claim 26, wherein the RF chain includes a frontend RF filter, a low noise amplifier (LNA), a mixer, an analog base-band low-pass filter, an A/D converter, a digital filter, a DC correction component, or an automatic gain control (AGC).

28. The non-transitory computer readable medium of claim 21, wherein the selecting operation comprises selecting an antenna based on a highest determined signal strength selected.

29. The non-transitory computer readable medium of claim 28, wherein the selecting operation further comprises calculating the signal parameter in at least two AGC acquisition periods of OFDM symbols prior to receiving a preamble.

30. The non-transitory computer readable medium of claim 29, wherein the processing operation further comprises turning off at least one processing block during the at least two AGC acquisition periods to conserver power.

31. An apparatus, comprising:
a monitor component configured to calculate a time correlation value based on one or more channel estimates for a signal received over the communication link, to monitor a signal parameter from a subset of antennas if the time correlation value is above a threshold indicative of a small Doppler spread, and to turn off antenna switching at high Doppler spread;
a switch component configured to perform, if the time correlation value is above the threshold, the operations of:
selecting at least one antenna from the subset of antennas based on the signal parameter, wherein the selected at least one antenna is used exclusively for data reception of a current frame; and
processing at least one signal from the selected at least one antenna in a wireless receiver associated with the subset of antennas.

32. The apparatus of claim 31, wherein the signal parameter is at least one of a received signal strength indication (RSSI) parameter, a Signal-to-Noise Ratio (SNR) parameter, or an effective SNR.

33. The apparatus of claim 31, further comprising means for decoding Orthogonal Frequency Division Multiplexing (OFDM) symbols.

34. The apparatus of claim 31, further comprising means for calculating, if the time correlation value is above the threshold, a received signal strength indication (RSSI) based on a Low Noise Amplifier (LNA) state value or an Automatic Gain control (AGC) loop accumulator value.

35. The apparatus of claim 31, wherein the monitoring comprises monitoring during preamble symbols of a current frame.

36. The apparatus of claim 35, wherein the processing at least one signal comprises assigning a radio frequency (RF) chain of components to process the signal.

37. The apparatus of claim 36, wherein the RF chain includes a front-end RF filter, a low noise amplifier (LNA), a mixer, an analog base-band low-pass filter, an A/D converter, a digital filter, a DC correction component, or an automatic gain control (AGC).

38. The apparatus of claim 31, wherein the selecting operation comprises selecting an antenna based on a highest determined signal strength selected.

39. The apparatus of claim 38, wherein the selecting operation further comprises calculating the signal parameter in at least two AGC acquisition periods of OFDM symbols prior to receiving a preamble.

40. The apparatus of claim 39, wherein the processing operation further comprises turning off at least one processing block during the at least two AGC acquisition periods to conserver power.

* * * * *